United States Patent [19]

Bell

[11] 4,158,217
[45] Jun. 12, 1979

[54] CAPACITIVE PRESSURE TRANSDUCER WITH IMPROVED ELECTRODE

[75] Inventor: Robert L. Bell, Chatsworth, Calif.

[73] Assignee: Kaylico Corporation, Chatsworth, Calif.

[21] Appl. No.: 746,853

[22] Filed: Dec. 2, 1976

[51] Int. Cl.² ............................................. H01G 5/16
[52] U.S. Cl. ...................................... 361/283; 73/718; 361/278
[58] Field of Search ............... 361/283, 303, 304, 278, 361/289, 298, 299; 344/61 P; 73/398 C, 718

[56] References Cited

U.S. PATENT DOCUMENTS

| | | | |
|---|---|---|---|
| Re. 19,688 | 9/1935 | Freese | 361/298 |
| 1,753,193 | 4/1930 | Bennett | 361/298 |
| 1,904,422 | 4/1933 | Dybvig | 361/299 |
| 1,924,366 | 8/1933 | Marstezler | 361/298 |
| 2,632,791 | 3/1953 | Side | 361/289 |
| 3,219,948 | 11/1965 | Williams | 361/289 |
| 3,398,338 | 8/1968 | Dornfeld | 361/304 |
| 3,814,998 | 6/1974 | Thoma | 73/398 C X |
| 4,064,550 | 12/1977 | Dias | 361/278 X |

OTHER PUBLICATIONS

Lion Instrumentation in Scientific Research, McGraw Hill, N.Y. 1959, pp. 66-72.

*Primary Examiner*—E. A. Goldberg
*Attorney, Agent, or Firm*—Gipple & Hale

[57] ABSTRACT

An electrode for use in capacitive pressure transducers of the type including either a single diaphragm electrode and a conductive reference plate separated by a gap or two diaphragm electrodes separated by a gap. The electrode comprises a conductive area having a plurality of nonconductive areas in the conductive area arranged and configured such that the capacitive fringe effects of the nonconductive areas substantially reduces the nonlinear component of the variation in the capacitance of the capacitive pressure transducer as a function of pressure.

13 Claims, 5 Drawing Figures

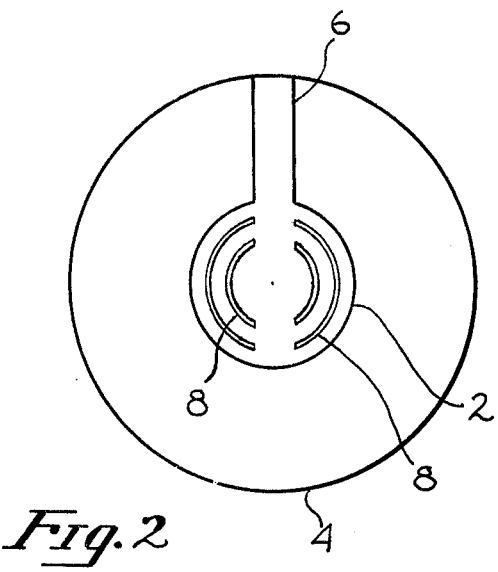
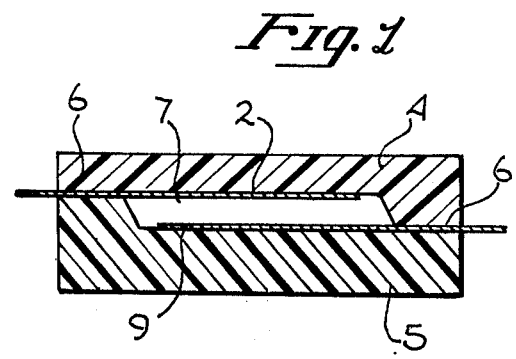
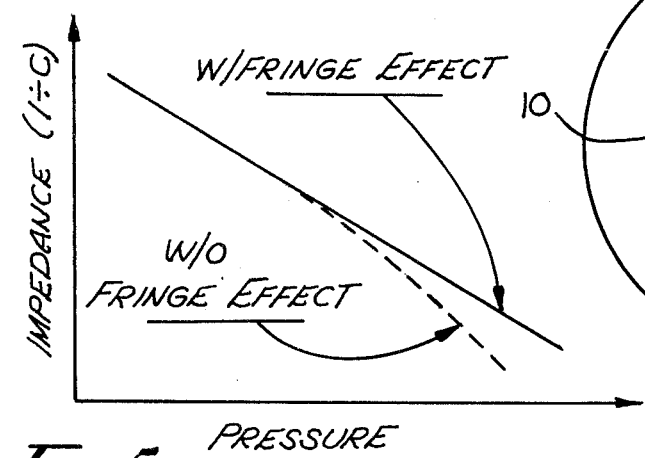
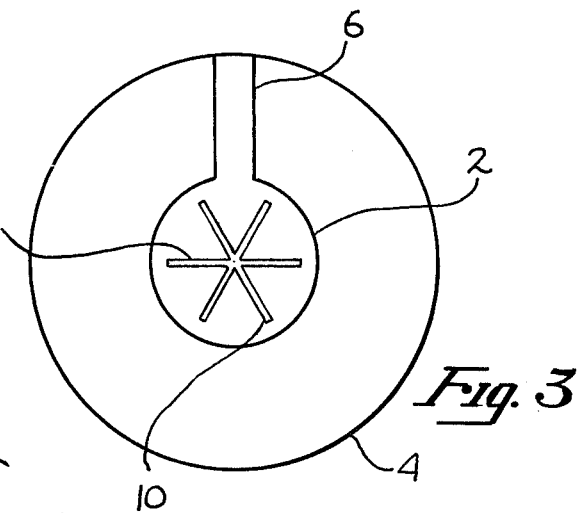
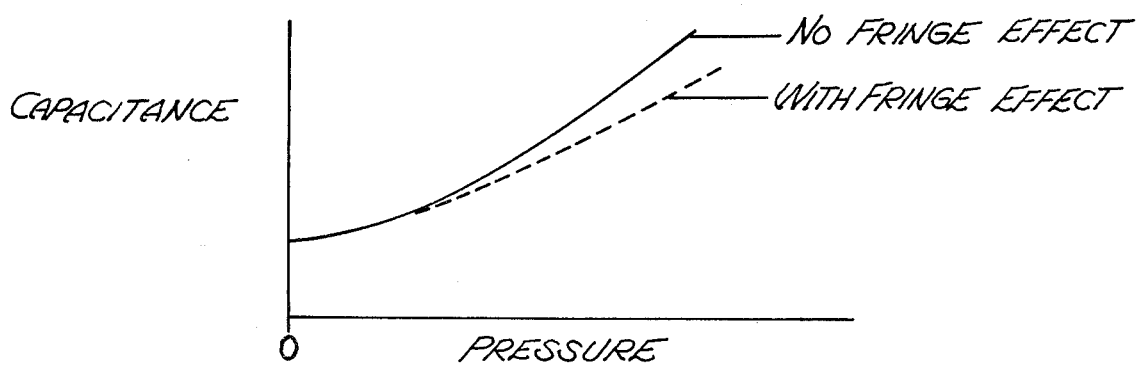

CAPACITIVE PRESSURE TRANSDUCER WITH IMPROVED ELECTRODE

FIELD OF THE INVENTION

This invention relates to pressure transducers and more particularly to capacitive pressure transducers.

DESCRIPTION OF THE PRIOR ART

There exists in the prior art several types of capacitive pressure transducers. These pressure transducers have one common difficulty and that difficulty is that the variation of their capacitance and impedance with changes in pressure applied are nonlinear functions. To compensate for these nonlinear functions, several techniques have been developed. Such techniques include such things as compensating electronics associated with a single sensor or very complex compensating electronics and a push-pull type capacitive sensor. Such compensating systems, while they do substantially compensate for the nonlinearities in the functions, do have their own disadvantages. First of all, they add to the complexity of the sensor and therefore add to the cost. Secondly, it is difficult to match the nonlinearities to the electronics to the nonlinearities of each individual capacitive transducer.

Accordingly, it is a general object of the present invention to provide an electrode for a capacitive pressure transducer which substantially reduces the nonlinear component of the variation of the capacitance and impedance of the pressure transducer as a function of change in pressure.

It is still another object of the present invention to provide an electrode for a capacitive pressure transducer which substantially eliminates the nonlinearities in the impedance (1÷c) versus pressure curve which is low in cost.

It is yet another object of the present invention to provide an electrode for a capacitive pressure transducer which substantially eliminates the nonlinearities in the impedance (1÷c) versus pressure characteristics which does not require complex electronics.

SUMMARY OF THE INVENTION

In keeping with the principles of the present invention, the objects are accomplished with a unique electrode for use in capacitive pressure transducers of the type including either a single diaphragm electrode and a conductive reference plate separated by a gap or two movable diaphragm electrodes separated by a gap. The improved electrode comprises a conductive area having a plurality of nonconductive areas arranged and configured in a pattern such that the capacitive fringe effects created around the nonconductive area substantially reduce the nonlinear component of the change in the impedance (1÷c) of the capacitive pressure transducer as a function of the change in pressure.

BRIEF DESCRIPTION OF THE DRAWINGS

The above mentioned and other features and objects of the present invention will become more apparent by reference to the following description taken in conjunction with the accompanying drawings, wherein like referenced numerals denote like elements, and in which:

FIG. 1 is a cross-sectional view of a capacitive pressure transducer of the type wherein an electrode in accordance with the principles of the present invention can be utilized;

FIG. 2 is a plan view of an electrode in accordance with the teachings of the present invention;

FIG. 3 is a plan view of a second embodiment of an electrode in accordance with the teachings of the present invention;

FIG. 4 is a graph of the capacitance of a pressure transducer without fringe effect and a pressure transducer in accordance with the teachings of the present invention; and FIG. 5 is a graph of the impedance (1 - c) of a capacitance pressure transducer versus pressure without fringe effect and a pressure transducer in accordance with the teachings of the present invention.

DESCRIPTION OF THE PREFERRED EMBODIMENT

Referring more particularly to the drawings, shown in FIG. 2 is one embodiment of an electrode in accordance with the teachings of the present invention. The electrode of FIG. 2 is utilized as one or both of the electrodes of any of the capacitive pressure transducers disclosed in Application for U.S. patent application, Serial No. 666,188, assigned to a common assignee, the contents of which are incorporated herein by reference. It is within the scope of the present invention to utilize the teachings of the invention with other types and forms of capacitive pressure transducers. One exemplary form of a capacitive transducer is shown in FIG. 1.

The electrode of FIG. 2 can be manufactured in substantially the same manner as described in the aforementioned Application for U.S. Letters Patent.

Briefly, the capacitive pressure transducer of FIG. 1 comprises a nonconductive diaphragm 4 and a nonconductive reference plate 5. A reference electrode 9 is formed on the reference plate 5 and a diaphragm electrode 7 is formed on the diaphragm 4. Furthermore, the opposing electrodes 7 and 9 may be arranged and configured such that the conductive paths 6 do not overlap. More particularly, in FIG. 2, the electrode 7 comprises a central circular portion 2 of conductive material provided on the inside surface of a nonconductive diaphragm 4 of the capacitive pressure transducer. The circular portion 2 of the electrode is electrically coupled to the edge of the diaphragm 4 by a conductive path 6 extending radially from the central portion 2 to the edge of diaphragm 4. The central circular portion 2 has a plurality of nonconductive curved areas 8 which are concentric with the center of central portion 2.

In practice, the nonconductive diaphragm 4 or reference plate 5 can be made from alumina. Furthermore, the conductive material can be a thin metallized layer. In particular, the electrode 7 consisting of central portion 2, path 6, and nonconductive areas 8 can be formed by screening a metallic paste onto the nonconductive diaphragm 4 and firing the diaphragm 4. In a similar manner, the electrode 9 can be formed.

As previously described, the electrode of FIG. 2 could be used as one or both of the electrodes in Application for U.S. Pat. Ser. No. 666,188. Furthermore, it should be apparent to one skilled in the art that it could be used as either the diaphragm electrode or as the reference electrode in a capacitive pressure transducer which consists of a diaphragm electrode and a nonmovable reference electrode.

In operation, in a capacitive pressure transducer, the nonconductive areas 8 do not substantially affect the capacitance of the capacitive pressure transducer when there is no pressure differential applied to the capacitive pressure transducer because of the fringe effect associated with the non-conductive areas. When a pressure differential is applied to the capacitive pressure transducer, the electrodes of the capacitor within the capacitive pressure transducer are pressed closer together. As the electrodes of the pressure transducer are pressed closer together, two opposing effects influence the capacitance of the pressure transducer. Firstly, the capacitance of the capacitive pressure transducer tends to increase nonlinearly as the electrodes come closer together. Secondly, the fringe effect becomes smaller as the electrodes become closer together thereby causing a reduction in the change of capacitance as the electrodes are pressed closer together by the pressure differential. Accordingly, the sum of these two effects substantially causes a cancellation of the nonlinear component of the increasing capacitance with increasing pressure differential, as shown in FIG. 4, and a corresponding effect on the linearity of the impedance as a function of pressure as shown in FIG. 5.

Referring to FIG. 3, shown therein is a second embodiment of the diaphragm electrode in accordance with the teachings of the present invention. Similarly to the electrode of FIG. 2, the electrode in FIG. 3 could be utilized in and manufactured in the same way as the capacitive pressure transducer disclosed in Application for U.S. Pat. Ser. No. 666,188. In FIG. 3, like elements to that of FIG. 1 have like referenced numerals.

In FIG. 3, the central circular conductive portion 2 has a plurality of straight electrically nonconductive areas 10 which interest in the vicinity of the center of the conductive portion 2 forming a star-like or spoke-wheel shape. In operation, a capacitive pressure transducer equipped with one or more of the diaphragm electrodes shown in FIG. 3 operates in substantially the same manner as described in accordance with FIG. 2.

It should be apparent to one skilled in the art that the central portion 2 need not be always circular but may be any other shape such as square, rectangular, elliptical, etc. Furthermore, it should be apparent that the non-conductive areas which increase the fringe effect could be nonintersecting nonconductive areas, closed circular nonconductive areas, etc.

It should also be apparent to one skilled in the art that the fringe effects of the outer boundary may be utilized in accordance with the teachings of the present invention. A complex shape for one electrode's outer boundary versus a regular shape on the other electrode would be one embodiment. Another would be to have one electrode smaller in diameter than the other. These and other similar embodiments are within the scope and teachings of the present invention and should be apparent to one skilled in the art.

In all cases it is understood that the above described embodiments are merely illustrative of but a few of the many possible specific embodiments which can represent application of the principles of the present invention. Numerous and varied other arrangements can be readily devised in accordance with these principles by those skilled in the art without departing from the spirit and scope of the invention.

I claim:

1. A capacitive pressure transducer comprising:
a pair of electrically insulative members, at least one of said electrically insulative members comprising an elastic diaphragm, said members being disposed one adjacent to the other and defining a gap there between;
a conductive layer applied to the inside surface of said members forming first and second layers, said layers being opposite and adjacent to each other across said gap;
means for bonding said members together in a spaced relationship to form a gap whereby the gap varies with the pressure applied to the transducer, thereby varying the capacitance between conductive members, said pressure being applied to apply a force to at least one of said members, and deflect said member in the direction of the force;
one of said conductive layers having a central electrically conductive area, said central conductive area defining a plurality of non-conductive areas arranged within said central conductive area and configured to create a capacitive fringe effect with said other layer of said transducer to minimize the non-linear component of the variation in the capacitance and the impedance of said capacitive pressure transducer as a function of pressure, whereby the transducer will supply a signal that is substantially more linear as a result of said pressure being applied to said transducer.

2. A capacitive pressure transducer comprising:
a first essentially planar diaphragm member made from an electrically insulative and elastic material having a low hysteresis, said planar member having a thickness that enables said member to be deflected when pressure is applied thereto and having on at least one side thereof a thin conductive layer intimately and inseparably adhered thereto forming an electrode member;
a second essentially planar member formed from the same material as the first planar member, said second planar member having a thin conductive layer intimately and inseparably adhered thereto on at least one side thereof to form an electrode member, said first planar member and said second planar member being disposed one on the other and being arranged and configured such that when said first planar member is disposed on said second planar member there exists a gap between said first planar member and said second planar member and said electrode members thereon are in opposition to one another;
one of said electrode members comprising:
a central electrically conductive area; and
a plurality of electrically nonconductive areas defined by said central conductive area within said central conductive area, said non-conductive areas being arranged and configured to create a capacitive fringe effect to substantially minimize the non-linear component of variation in the capacitance of said pressure transducer as a function of pressure;
means for bonding the first planar member to the second planar member forming a capacitor which has a capacitance that varies with the pressure applied to the transducer as a result of deflection of said planar members with respect to one another, with said variation of capacitance having its non-linear component minimized by the configuration of at least one of the electrode members.

3. The capacitor according to claim 2 wherein said nonconductive areas form a plurality of a curved concentric areas with the center of said central conductive area.

4. The capacitor according to claim 2 wherein said nonconductive areas form a plurality of intersecting spaces having a star-like configuration.

5. The capacitor according to claim 2 wherein said diaphragm is an electrically nonconductive material and said electrodes are in the form of a film of metalization and said nonconductive areas are in the form of openings in said film.

6. A capacitive pressure transducer comprising:
a first essentially planar diaphragm member made from an electrically insulative and elastic material having a low hysteresis, said planar member having on at least one side thereof a thin conductive layer intimately and inseparably adhered thereto forming an electrode member;
a second essentially planar member formed from the same material as said first planar member, said second planar member having a thin conductive layer intimately and inseparably adhered thereto on at least one side thereof to form an electrode member, said first planar member and said second planar member being disposed one on the other and being arranged and configured such that when said first planar member is disposed on said second planar member there exists a gap between said first planar member and said second planar member and said electrode members thereon are in opposition to one another; means for bonding the first planar member to said second planar member in a spaced relationship to form said gap thereby forming a capacitor which has a capacitance that varies with the pressure applied to the transducer as a result of the deflection of at least one of said planar members with respect to the other; and
at least one of said electrode members having a central electrically conductive area defining a plurality of openings in said central conductive area to effect a capacitive fringe effect between the edges of said openings and the other electrode member of said transducer to minimize the non-linear component of the variation in capacitance which non-linear component would otherwise occur upon the deflection of at least one of said planar members with respect to the other planar member.

7. The capacitor according to claim 6 wherein said plurality of openings are concentric with the center of said central area.

8. The capacitor according to claim 6 wherein said openings are straight nonconductive areas defining a star-like configuration.

9. A capacitive pressure transducer comprising:
a pair of members each carrying an electrode thereon, which electrodes are in an opposed relationship to one another, at least one of said members being subject to deflection to and from said other member upon the application of pressure thereto, said electrode bearing members being in spaced relationship so that the deflection of one member with respect to the other member results in a change in the spacing of one electrode with respect to the other electrode;
at least one of said electrodes comprising:
a central electrically conductive area; and
a plurality of electrically non-conductive areas provided in said central conductive area, said non-conductive areas being arranged and configured to create a capacitive fringe effect to substantially minimize the non-linear component of the variation of capacitance and impedance of said capacitive pressure transducer as a function of pressure.

10. The capacitor according to claim 9 wherein said nonconductive areas form a plurality of curved areas concentric with the center of said central conductive area.

11. The capacitor according to claim 9 wherein said plurality of nonconductive areas form a star-like configuration.

12. The capacitor according to claim 9 wherein said diaphragm is electrically nonconductive material and said electrodes are in the form of a film of metallization and said nonconductive area is in the form of openings in said film.

13. The capacitor according to claim 12 wherein said nonconductive material is alumina.

* * * * *